United States Patent
Sankhla

(10) Patent No.: US 11,726,550 B2
(45) Date of Patent: Aug. 15, 2023

(54) METHOD AND SYSTEM FOR PROVIDING REAL-TIME VIRTUAL FEEDBACK

(71) Applicant: Samsung Electronics Co., Ltd., Suwon-si (KR)

(72) Inventor: Anindhya Sankhla, Uttar Pradesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/275,645

(22) PCT Filed: Jul. 3, 2019

(86) PCT No.: PCT/KR2019/008153
§ 371 (c)(1),
(2) Date: Mar. 11, 2021

(87) PCT Pub. No.: WO2020/054954
PCT Pub. Date: Mar. 19, 2020

(65) Prior Publication Data
US 2022/0057856 A1 Feb. 24, 2022

(30) Foreign Application Priority Data
Sep. 11, 2018 (IN) .............................. 201841034250

(51) Int. Cl.
| | |
|---|---|
| *G06F 3/01* | (2006.01) |
| *A63B 24/00* | (2006.01) |
| *A63B 71/06* | (2006.01) |
| *G06T 7/20* | (2017.01) |
| *G06T 7/70* | (2017.01) |
| *G06T 11/00* | (2006.01) |

(Continued)

(52) U.S. Cl.
CPC .......... *G06F 3/011* (2013.01); *A63B 24/0062* (2013.01); *A63B 71/0622* (2013.01);
(Continued)

(58) Field of Classification Search
CPC ............ A63B 24/0062; A63B 71/0622; A63B 2024/0068; A63B 2024/0096;
(Continued)

(56) References Cited

U.S. PATENT DOCUMENTS

| | | |
|---|---|---|
| 8,538,562 B2 | 9/2013 | Pryor et al. |
| 9,262,673 B2 | 2/2016 | Shotton et al. |

(Continued)

FOREIGN PATENT DOCUMENTS

| | | |
|---|---|---|
| CN | 106097787 A | 11/2016 |
| JP | 2013-206273 A | 10/2013 |

(Continued)

OTHER PUBLICATIONS

International Search Report dated Oct. 11, 2019 in connection with International Patent Application No. PCT/KR2019/008153, 3 pages.

(Continued)

*Primary Examiner* — Mihir K Rayan

(57) ABSTRACT

Accordingly, embodiments herein disclose a method for providing real-time virtual feedback using an electronic device. The method includes receiving, by the electronic device, motion data of each segment in a multi-segment body part of a first user. Further, the method includes determining, by the electronic device, a posture information of each of the segment in the multi-segment body part based on the motion data of each of the segment in the multi-segment body part of the first user. Further, the method includes determining, by the electronic device, a degree of similarity between the posture information of each of the segment in the multi-segment body part of the first user and a posture information of each segment in a multi-segment body part of a second user. Further, the method includes providing, by the electronic device, a virtual feedback to the first user based on the degree of similarity.

13 Claims, 15 Drawing Sheets

(51) Int. Cl.
   *G06T 13/40*     (2011.01)
   *G06T 13/80*     (2011.01)
   *G09B 19/00*     (2006.01)
(52) U.S. Cl.
   CPC .............. *G06F 3/016* (2013.01); *G06T 7/20* (2013.01); *G06T 7/70* (2017.01); *G06T 11/00* (2013.01); *G06T 13/40* (2013.01); *G06T 13/80* (2013.01); *A63B 2024/0068* (2013.01); *A63B 2024/0096* (2013.01); *A63B 2071/0625* (2013.01); *A63B 2071/0655* (2013.01); *A63B 2230/62* (2013.01); *A63B 2244/22* (2013.01); *G06T 2207/10024* (2013.01); *G06T 2207/10028* (2013.01); *G06T 2207/30196* (2013.01); *G09B 19/0015* (2013.01)
(58) Field of Classification Search
   CPC .... A63B 2071/0625; A63B 2071/0655; A63B 2330/62; A63B 2244/22; G06F 3/011; G06F 3/016; G06T 7/20; G06T 7/70; G06T 11/00; G06T 13/40; G06T 13/80
   See application file for complete search history.

(56) References Cited

U.S. PATENT DOCUMENTS

| | | | | |
|---|---|---|---|---|
| 2004/0219498 | A1* | 11/2004 | Davidson | A63B 69/00 434/247 |
| 2009/0220124 | A1* | 9/2009 | Siegel | G06T 7/292 382/103 |
| 2011/0054870 | A1 | 3/2011 | Dariush et al. | |
| 2011/0270135 | A1 | 11/2011 | Dooley et al. | |
| 2014/0135960 | A1* | 5/2014 | Choi | A61B 5/0205 700/91 |
| 2014/0306866 | A1 | 10/2014 | Miller et al. | |
| 2015/0035827 | A1 | 2/2015 | Yamaoka et al. | |
| 2015/0099252 | A1* | 4/2015 | Anderson | G06T 7/251 434/257 |
| 2016/0262688 | A1 | 9/2016 | Nichols | |
| 2017/0178380 | A1* | 6/2017 | Ivers | G06T 13/40 |
| 2017/0358243 | A1 | 12/2017 | Kim et al. | |
| 2020/0111384 | A1* | 4/2020 | Bell | A61B 5/11 |

FOREIGN PATENT DOCUMENTS

| | | |
|---|---|---|
| KR | 10-2017-0010157 A | 1/2017 |
| KR | 10-2017-0140756 A | 12/2017 |
| WO | 2018/112112 A1 | 6/2018 |

OTHER PUBLICATIONS

Written Opinion of the International Searching Authority dated Oct. 11, 2019 in connection with International Patent Application No. PCT/KR2019/008153, 5 pages.

* cited by examiner

1. Center hip
2. Spine
3. Center Shoulder
4. Head
5. Left shoulder
6. Left elbow
7. Left wrist
8. Left hand
9. Right shoulder
10. Right elbow
11. Right wrist
12. Right hand
13. Left hip
14. Left knee
15. Left ankle
16. Left foot
17. Right hip
18. Right knee
19. Right ankle
20. Right foot

METHOD AND SYSTEM FOR PROVIDING REAL-TIME VIRTUAL FEEDBACK

CROSS-REFERENCE TO RELATED APPLICATIONS

This application is a 371 of International Application No. PCT/KR2019/008153 filed on Jul. 3, 2019, which claims priority to India Patent Application No. 201841034250 filed on Sep. 11, 2018, the disclosures of which are herein incorporated by reference in their entirety.

BACKGROUND

1. Field

The present disclosure relates to a learning system, and more specifically related to a method and an apparatus for providing a real-time virtual feedback for a leaning purpose using an electronic device.

2. Description of Related Art

In general, a user (e.g., sport person, patient, dancer, or the like) wants to learn and grow their interests, hobbies, passions and fitness in different ways. In basically, in order to learn a user interest, the user finds a best tutor and learn a subject manner. But, finding the best tutor is a great problem. Further, the user may prefer to learn at home at a flexible time rather than going to the tutor if they are busy in their schedule. If they find a best tutor, the user are packed into classes, tutor training costs are more and lack of individual continuous feedback is also there.

Thus, it is desired to address the above mentioned disadvantages or other shortcomings or at least provide a useful alternative.

SUMMARY

The principal object of the embodiments herein is to provide a method and a system for providing real-time virtual feedback using an electronic device.

Another object of the embodiment herein is to receive a motion data of each segment in a multi-segment body part related to a first user.

Another object of the embodiment herein is to determine a posture information of each segment in the multi-segment body part based on a motion data of the each segment in the multi-segment body part related to the first user.

Another object of the embodiment herein is to determine a degree of similarity between the posture information of each segment in the multi-segment body part related to the first user and a posture information of each segment in a multi-segment body part related to a second user.

Another object of the embodiment herein is to provide a virtual feedback to the first user based on the degree of similarity.

Accordingly, embodiments herein disclose a method for providing real-time virtual feedback using an electronic device. The method includes receiving, by the electronic device, motion data of each segment in a multi-segment body part of a first user. Further, the method includes determining, by the electronic device, a posture information of each of the segment in the multi-segment body part based on the motion data of each of the segment in the multi-segment body part of the first user. Further, the method includes determining, by the electronic device, a degree of similarity between the posture information of each of the segment in the multi-segment body part of the first user and a posture information of each segment in a multi-segment body part of a second user. Further, the method includes providing, by the electronic device, a virtual feedback to the first user based on the degree of similarity.

In an embodiment, determining the posture information of each of the segment in the multi-segment body part based on the motion data of each of the segment in the multi-segment body part of the first user includes identifying at least one of an activity of the first user, generating a virtual skeleton view of the multi-segment body part of the user, determining at least one of an angle of limbs movement and a deviation of each of the segment of the multi-segment body part of the first user with respect to motion data of the multi-segment body part of the second user, and determining the posture information of each of the segment in the multi-segment body part based on at least one of the angle of the limbs movement and the deviation of each of the segment of the multi-segment body part of the first user.

In an embodiment, the virtual skeleton view is generated based on a Red, Green, and Blue (RGB) image and a depth image of the multi-segment body part captured using the electronic device.

In an embodiment, determining at least one of the angle of limbs movement and the deviation of each of the segment of the multi-segment body part of the first user with respect to the motion data of the multi-segment body part of the second user includes determining a limb score by matching the limbs using angular displacement around each of the joints containing at least two segments and weight factors for each of the joints, determining an angular displacement based on difference in angular components of the first user and the second user, and determining at least one of the angle of the limbs movement and the deviation of each of the segment of the multi-segment body part of the first user based on the angular displacement and the limb score.

In an embodiment, determining the degree of similarity between the posture information of each of the segment in the multi-segment body part of the first user and the posture information of each segment in the multi-segment body part of the second user includes determining a match between each of the segment of the multi-segment body part of the first user with each segment in the multi-segment body part of the second user, and determining the degree of similarity based on the match.

In an embodiment, providing the virtual feedback to the first user based on the degree of similarity includes simultaneously displaying an avatar of the first user and displaying an avatar of the second user on the electronic device, and displaying the virtual feedback corresponding to the avatar of the first user based on the degree of similarity, wherein the virtual feedback includes a feedback for each of the segment in the multi-segment body part of the first user and an overall feedback for the multi-segment body part of the first user.

In an embodiment, the virtual feedback includes at least one of a visual indication indicating the degree of similarly, a haptic feedback indicating the degree of similarly, and an audio feedback indicating the degree of similarly.

In an embodiment, an intensity of the haptic feedback is dynamically controlled based on the degree of similarly.

In an embodiment, the multi-segment body part includes at least one of a lower arm of the user, a upper arm of the user, fingers of the user, a palm of the user, a head of the user, a neck of the user, a torso of the user, an ankle of the user, a knee of the user, a hip of the user, a shoulder of the user, an elbow of the user, a wrist of the user, an upper neck of the user.

Accordingly, embodiments herein disclose an electronic device for providing real-time virtual feedback. The electronic device includes a memory, a processor, a posture engine and a virtual feedback engine. The posture engine is coupled to the memory and the processor. The posture engine is configured to receive motion data of each segment in a multi-segment body part of a first user. Further, the posture engine is configured to determine a posture information of each of the segment in the multi-segment body part based on the motion data of each of the segment in the multi-segment body part of the first user. Further, the virtual feedback engine is configured to determine a degree of similarity between the posture information of each of the segment in the multi-segment body part of the first user and a posture information of each segment in a multi-segment body part of a second user. Further, the virtual feedback engine is coupled to the memory, the processor and the posture engine. The virtual feedback engine is configured to provide a virtual feedback to the first user based on the degree of similarity.

Accordingly, embodiments herein disclose a system for providing real-time virtual feedback. The system includes an electronic device and a haptic feedback suite having a set of sensors. The electronic device is configured to receive motion data of each segment in a multi-segment body part of a first user. The electronic device is configured to determine a posture information of each of the segment in the multi-segment body part based on the motion data of each of the segment in the multi-segment body part of the first user. The electronic device is configured to determine a degree of similarity between the posture information of each of the segment in the multi-segment body part of the first user and a posture information of each segment in a multi-segment body part of a second user. The electronic device is configured to send a feedback to the haptic feedback suite based on the degree of similarity. The haptic feedback suite is configured to receive the feedback from the electronic device and provide the feedback to the each of the segment in the multi-segment body part of the first user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1:
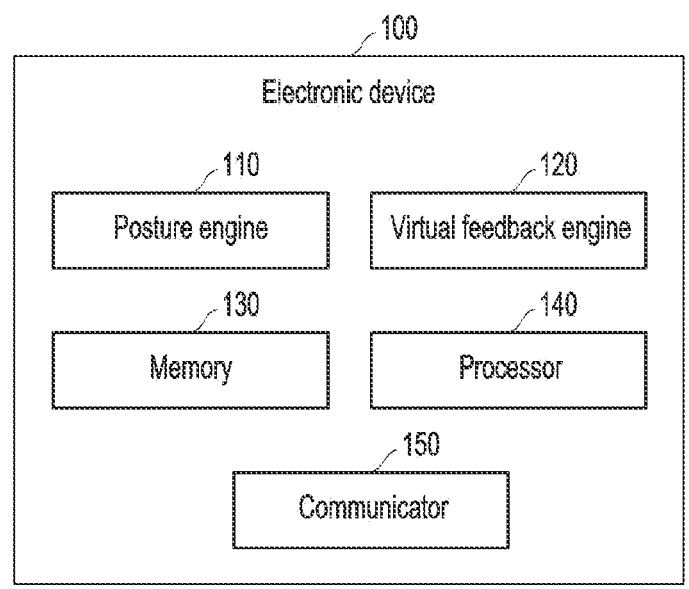
FIG. 1 illustrates a block diagram of an electronic device, according to an embodiment as disclosed herein.

Hereinafter, operation principles of exemplary embodiments of the disclosure will be described in detail with reference to accompanying drawings. Like reference numerals designate like components in the drawings where possible even though components are shown in different drawings. In the following description of the disclosure, a detailed description of related known functions or configurations will be omitted so as not to obscure the subject of the disclosure. The terms as described below are defined in consideration of the functions in the embodiments, and the meaning of the terms may vary according to the intention of a user or operator, convention, or the like. Therefore, the definitions of the terms should be made based on the contents throughout the specification.

The disclosure may have various modifications and various embodiments, among which specific embodiments will now be described more fully with reference to the accompanying drawings. However, it should be understood that there is no intent to limit the disclosure to the particular forms disclosed, but on the contrary, the disclosure is to cover all modifications, equivalents, and alternatives falling within the spirit and scope of the disclosure.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the constituent elements are not limited by the terms. The terms are used merely for the purpose to distinguish an element from the other elements. For example, a first element could be termed a second element, and similarly, a second element could be also termed a first element without departing from the scope of the disclosure. As used herein, the term "and/or" includes any and all combinations of one or more associated items.

The terms used herein are used only to describe particular embodiments, and are not intended to limit the disclosure. As used herein, the singular forms are intended to include the plural forms as well, unless the context clearly indicates otherwise. In the disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the disclosure. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for providing real-time virtual feedback using an electronic device. The method includes receiving, by the electronic device, motion data of each segment in a multi-segment body part of a first user. Further, the method includes determining, by the electronic device, a posture information of each of the segment in the multi-segment body part based on the motion data of each of the segment in the multi-segment body part of the first user. Further, the method includes determining, by the electronic device, a degree of similarity between the posture information of each of the segment in the multi-segment body part of the first user and a posture information of each segment in a multi-segment body part of a second user. Further, the method includes providing, by the electronic device, a virtual feedback to the first user based on the degree of similarity.

Unlike conventional methods and system, the proposed method can be used to provide continuous, real time information to a user related to user's movement in an easy manner while the user is in at least one of a virtual reality (VR) mode, an augmented reality (AR) mode and a mixed augmented reality mode. The method can be used to provide continuous, real time information to the user while the user is trained using expert's data by calculating angle of limbs movement and step by step deviation of users steps in an effective manner. This results in providing a real time feedback for exercises which helps in faster and easier rehabilitation.

The proposed method can be used to provide the continuous feedback to the user and help the user to learn and grow their interests, hobbies, passions and fitness without the involvement of a physical tutor using a virtual reality device. While learning arts/exercise, a user/learner will be shown the visual feedback that contains the learner and expert movements comparison, trajectory of next movement, the level of correctness in the form of scores/rating.

The proposed method can be implemented in various areas such as in a medical domain for rehabilitation, user activity monitoring, learning platform, health sector and fitness training, an automatic tracking of user caloric expenditures and fitness or protective accessories suggestion fields.

Referring now to the drawings, and more particularly to FIGS. 1 through 13*b*, there are shown preferred embodiments.

FIG. 1 illustrates a block diagram of an electronic device, according to an embodiment as disclosed herein. The electronic device 100 can be, for example, but not limited to a VR device, an augmented reality (AR) device, a smart phone, a mixed AR device or the like. In an embodiment, the electronic device 100 includes a posture engine 110, a virtual feedback engine 120, a memory 130, a processor 140, and a communicator 150.

The posture engine 110 is configured to receive the motion data of each segment in a multi-segment body part of a first user. The first user can be, for example, but not limited to a sport person, a patient, a dancer, athletes or the like. The multi-segment body part can be, for example, but not limited to a lower arm of the user, a upper arm of the user, fingers of the user, a palm of the user, a head of the user, a neck of the user, a torso of the user, an ankle of the user, a knee of the user, a hip of the user, a shoulder of the user, an elbow of the user, a wrist of the user, and an upper neck of the user.

Based on the motion data of each segment in the multi-segment body part of the first user, the posture engine 110 is configured to determine a posture information of each segment in the multi-segment body part.

In an embodiment, the posture engine 110 is configured to determine the posture information of each segment in the multi-segment body part by identifying at least one of an activity of the first user, generating a virtual skeleton view of the multi-segment body part related to the user, determining at least one of an angle of limbs movement and a deviation of each segment of the multi-segment body part related to the first user with respect to a motion data of the multi-segment body part related to a second user, and determining the posture information of each segment in the multi-segment body part based on at least one of the angle of the limbs movement and the deviation of each segment of the multi-segment body part related to the first user. The second user can be a trainer and a master for the first user.

In an embodiment, the virtual skeleton view is generated based on a Red, Green, and Blue (RGB) image and a depth image of the multi-segment body part captured using a sensor (e.g. 3D camera or the like).

In an example, the electronic device 100 obtains a person (i.e., first user) in an image, the electronic device 100 obtains its pose as a set of 20 body joints (i.e., 3D location) using a person detector or any other sensor. The person detector contains a convolutional neural network (CNN) network simultaneously predicts a set of 3D confidence maps of body part locations and a set affinities fields, which encode the degree of association between parts. The confidence maps and the affinity fields are parsed by greedy inference to output the 3D key points for the user in the image as shown in the FIG. 4d and FIG. 4e.

In another example, the electronic device 100 is configured to detect the image of the first user using the sensor. Based on the image, the electronic device 100 defines a pose of the image as a set of these body joints in a 2D location. The body joints can be, for example but not limited to, an ankle, a knee, a hip, a shoulder, an elbow, a wrist, a pelvis, an upper neck or the like. Further, the electronic device 100 encodes the degree of association between parts using the multi-staged CNN. The multi-staged CNN provides confidence maps of body joint locations and a set affinities fields. Further, the electronic device 100 connects the joints to predict the body posture.

In an example, from sets of 20 joints data, the electronic device 100 calculates 18 angular points' data. At a joint point, Y-axis is along the parent bone, X-axis is 90 degree right to Y-axis and Z-axis is coming out of the plane of X and Y-axes. In order to calculate the angle between two adjacent bones (B1 and B2) formed by 3 joint co-ordinates J1, J2 and J3 (where B1: J1 J2 and B2: J2→J3), the electronic device 100 converts the co-ordinates into vectors V1=J1−J2 and V2=J3−J2 by treating J1 as the parent joint. Further, the electronic device 100 normalizes and computes the arc cosine of each component in X, Y and Z directions to get the angle between B1 and B2. In order to understand the features better, let us take an example, suppose the dancer has spread both his hands wide in sideways in a given posture, so that the electronic device 100 can describe the posture as right hand making an angle in the range of +90 to +100 from spine and left hand making −90 to −100 angle from spine. These angles succinctly describe the upper body posture (of hands). Each angular data contains 3 angles component with X, Y and Z planes centered at given joints, as shown in the FIG. 4d and FIG. 4e.

In an embodiment, the posture engine 110 is configured to determine a limb score by matching the limbs using angular displacement around each of the joints containing at least two segments and weight factors for each of the joints. The angular displacement means a difference between the angular components of the first user and the angular components of the second user. Further, the posture engine 110 is configured to determine the angular displacement based on difference in angular components of the first user and the second user. Further, the posture engine 110 is configured to determine at least one of the angle of the limbs movement and the deviation of each segment of the multi-segment body part related to the first user based on the angular displacement and the limb score. The weight factors are obtained based on each joint.

Further, the posture engine 110 is configured to determine a degree of similarity between the posture information of each segment in the multi-segment body part related to the first user and the posture information of each segment in a multi-segment body part related to the second user.

In an embodiment, the posture engine 110 is configured to determine the degree of similarity between the posture information of each segment in the multi-segment body part related to the first user and the posture information of each segment in the multi-segment body part related to the second user by determining a match between each segment of the multi-segment body part related to the first user with each segment in the multi-segment body part related to the second user.

In an example, for each frame, the limb score is determined by matching the limbs using angular displacement around each of the joints containing at least two segments and weight factors for each of the joints. The limb score is 1/WA' where A is the vector containing error angle in matching of limbs around each joints and W is weights for each joints. The posture engine 110 calculates the error angles and score of matching based on the difference of angular components of each joints between the user limbs data and expert limbs data. The flexibility constant will be determined by pre-alignment steps where the user enact some posture to its full stretch and its difference with the expert's pose is noted.

Let $(E_{ix}, E_{iy}, E_{iz})$ be the 3 components of angles of $i^{th}$ joint of the expert. Let $(L_{ix}, L_{iy}, L_{iz})$ be the 3 components of angles of $i^{th}$ joint of the learner. Further, the posture engine 110 defines a flexibility constant $(F_{ix}, F_{iy}, F_{iz})$ for $i^{th}$ joint such that $$F_{ix}=E_{ix}/L_{ix}$$

$$F_{iy}=E_{iy}/L_{iy}$$

$$F_{iz}=E_{iz}/L_{iz}$$

In an embodiment, the posture engine 110 is configured to calculate the angles of the limb movement by obtaining learner joints point data, $J_1, J_2, J_3, \ldots J_{20}$, and converting them into vectors ($V_k=J_i-J_{i+1}$ and $V_{k+1}=J_{i+2}-J_{i+1}$) between 2 adjacent bones ($B_k$ and $B_{k+1}$) formed by 3 joint co-ordinates $J_i$, $J_{i+1}$ and $J_{i+2}$ in a particular sequence (where $B_k$: $J_i$ $J_{i+1}$ & $B_{k+1}$: $J_{i+1}$ $J_{i+2}$), and normalizing and computing the arc cosine of each component in X ($L_{ix}$), Y($L_{iy}$), and Z($L_{iz}$), directions to get the 3 angle components between $B_k$ and $B_{k+1}$.

In an embodiment, the posture engine 110 is configured to calculate the score of the first user's posture (i.e., learner pose) with respect to the second user's posture (i.e. expert's pose). Let score of $i^{th}$ joint of $m^{th}$ learner frame with respect to $n^{th}$ expert frame be $S^i_{mn}$ and error angle be $A^i_{mn}$; $A^i_{mn}{}^2 = 1/S^i_{mn}{}^2 = (F_{ix} * E_{ix})^2 + (F_{iy} * L_{iy} - E_{iy})^2 + (F_{iz} * L_{iz} - E_{jz})^2$.

Where ($F_{ix}$, $F_{iy}$, $F_{iz}$) is the flexibility constant calculated in pre alignment step, and ($E_{jx}$, $E_{jy}$, $E_{jz}$) is the expert angles component for $i^{th}$ limb calculated in the same way as learners.

Further, the overall score of a posture at m frame with respect to expert posture at n is calculated as $S_{mn} = 1/A_{mn} = 1/WA_{mn}$, where $W_{mn}$ is the vector containing the normalized weight vector for each joints and C is the vector $[C_1, C_2, C_3, \ldots C_{18}]$.

Between two consecutive key frames, scores for all frames are obtained and mapping is done based on the best matched frames from the expert frames based on the scores calculated above, such that the time sequence is maintained (this is done in order to handle the case when the user perform the posture slower/faster than the expert). This way the posture engine 110 obtains the dynamic scores of the sequence of postures. Based on the scores calculated, the virtual feedback engine 120 will provide the visual feedback to the user.

In an embodiments, using variant of Dynamic Time Wrapping (DTW) procedures, mapping of learner with the expert frame is done in a movement and a movement error as well as a dynamic score of a movement are calculated.

In an example, procedures for calculating movement error angle is indicated below:

```
interrorAngleMovement(leaner frame [1..m], expert frame [1..n]) {
E := 2Darray [0..m, 0..n]
for i:= 1 to m
EA [i, 0] := infinity
for i:= 1 to n
EA [0, i] := infinity
EA [0, 0] := 0
for i:= 1 to m
for j: = 1 to n
cost: = Aij // error distance of i^th frame
// of learner with j^th frame of expert
EA [i, j] := cost + minimum (EA[i-1, j ], EA[i, j-1], EA[i-1, j-1])
return EA [n, m]
}
```

Where EA(i, j) is the error angle between learner frames [1:i] and expert frames [1:j] with the best alignment. The dynamic score for the movement at frame i, $DSi = 1/EA(i, m)$ where m is the total number of frames of the expert movement.

Based on the degree of similarity, the virtual feedback engine 120 is configured to provide the virtual feedback to the first user. The virtual feedback, can be for example, but not limited to a visual indication indicating the degree of similarly, a haptic feedback indicating the degree of similarly, and an audio feedback indicating the degree of similarly. In an embodiment, an intensity of the haptic feedback is dynamically controlled based on the degree of similarly.

In an embodiment, the virtual feedback engine 120 is configured to simultaneously display an avatar of the first user and display an avatar of the second user on the electronic device 100. Further, the virtual feedback engine 120 is configured to display the virtual feedback corresponding to the avatar of the first user based on the degree of similarity. The virtual feedback includes a feedback for each of the segment in the multi-segment body part of the first user and an overall feedback for the multi-segment body part of the first user.

The virtual feedback engine 120 provides the dynamic visual feedback based on scores calculated by the step by step angular deviation of each limb from expert's. The feedback is in the form of movement trajectories, colors, rating of each joints and comparison of both views (learner and experts) side by side.

In an example, a virtual reality headset connected to a smart phone/laptop and the 3D camera (RGB+depth sensor) kept in front of the user (i.e. learner) which will communicate with the smartphone/laptop wirelessly. The user/learner stands in front of camera and will select the art (e.g., sports learning, yoga or the like) that the user want to learn. Each art involving the body movement will have the expert data stored in a cloud/server. The smartphone/laptop will communicate with the cloud/server and download the particular expert data. The expert data contains the angular data for each posture in the movements. These angular data includes 3 Euler angles with X, Y and Z planes centered at each of the joints. Based on the movement comparison, the electronic device 100 provides the feedback to the user.

The posture engine 110 and the virtual feedback engine 120 may be the processor 140.

Further, the processor 140 is configured to execute instructions stored in the memory 130 and to perform various processes. The communicator 150 is configured for communicating internally between internal hardware components and with external devices via one or more networks. The communicator 150 is configured for communicating with the posture engine 110 and the virtual feedback engine 120 to provide the virtual feedback to the first user based on the degree of similarity in the electronic device 100.

The memory 130 stores the angular data of the posture of the user (i.e., learner), the angular data of each movements of the user, the angular data of the posture of the trainer and the angular data of each movements of the of the trainer. The memory 130 also stores instructions to be executed by the processor 140. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

In an embodiment, the posture engine 110 includes a motion data obtaining unit, a virtual skeleton view generating unit, a posture information determining unit, a limb score determining unit, an angular displacement determining unit, a degree of similarity determining unit which are communicated with the virtual feedback engine 120 and the processor 140 to provide the real-time virtual feedback in the electronic device 100. The motion data obtaining unit, the virtual skeleton view generating unit, the posture information determining unit, the limb score determining unit, the angular displacement determining unit and the degree of similarity determining unit may be the processor 140.

In an embodiment, the virtual feedback engine 120 includes a visual indication engine, a haptic feedback engine and an audio feedback engine.

Although the FIG. 1 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function to provide the real-time virtual feedback using the electronic device 100.

Figure 2:
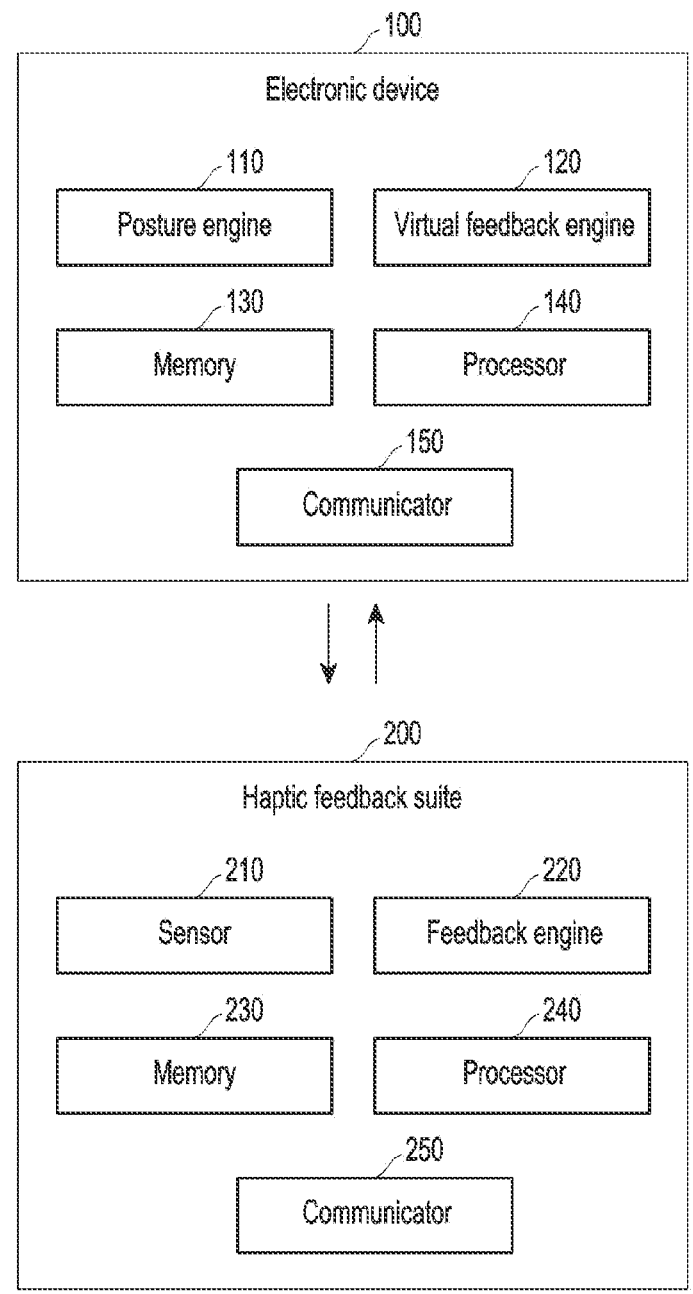
FIG. 2 illustrates a block diagram of a system for providing real-time virtual feedback, according to embodiments as disclosed herein.

FIG. 2 illustrates a block diagram of a system for providing real-time virtual feedback, according to embodiments as disclosed herein. In an example, the system 1000 includes the electronic device 100 and a haptic feedback suite 200. The haptic feedback suite 200 includes one or more sensor 210, a feedback engine 220, a memory 230, a processor 240, and a communicator 250.

The operations and functions of the electronic device 100 are explained in conjunction with the FIG. 1. The electronic device 100 is configured to receive a motion data of each segment in the multi-segment body part related to the first user. The electronic device 100 is configured to determine the posture information of each segment in the multi-segment body part based on the motion data of each segment in the multi-segment body part related to the first user. Further, the electronic device 100 is configured to determine the degree of similarity between the posture information of each segment in the multi-segment body part related to the first user and the posture information of each segment in the multi-segment body part related to the second user. Further, the electronic device 100 is configured to send the feedback to the haptic feedback suite 200 based on the degree of similarity. The haptic feedback suite 200 is configured to receive the feedback from the electronic device 100 and provide the feedback to the each segment in the multi-segment body part related to the first user.

Further, the processor 240 is configured to execute instructions stored in the memory 230 and to perform various processes. The communicator 250 is configured for communicating internally between internal hardware components and with external devices via one or more networks. The communicator 250 is configured for communicating with the sensor 210 and the feedback engine 220 to provide the virtual feedback to the first user based on the degree of similarity in the electronic device 100. The memory 230 also stores instructions to be executed by the processor 240.

Although the FIG. 2 shows overview of the system 1000 but it is to be understood that other embodiments are not limited thereon. In other embodiments, the system 1000 may include less or more number of components. Further, the labels or names of the components are used only for illustrative purpose and does not limit the scope of the invention.

Figure 3:
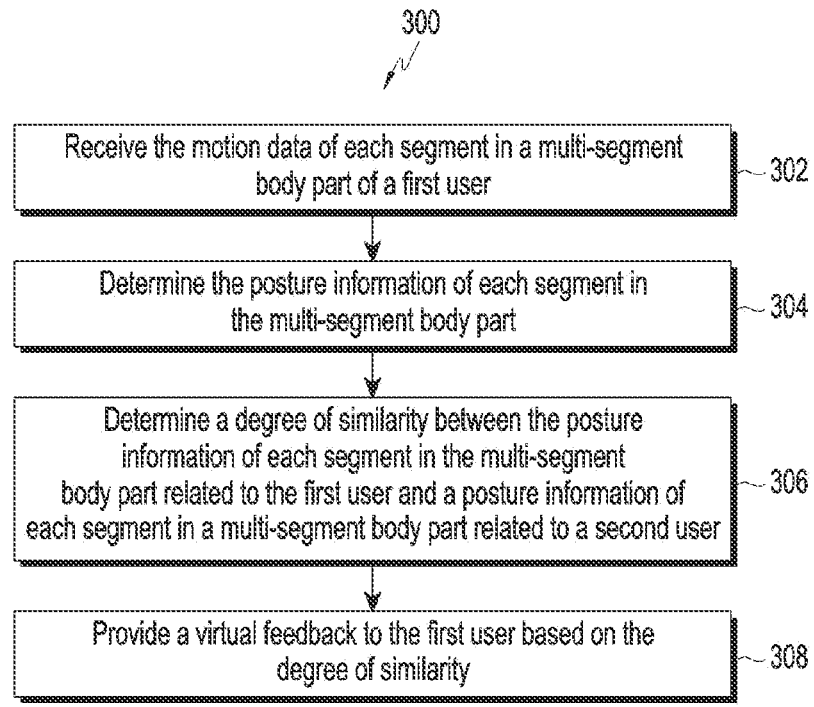
FIG. 3 illustrates a flow diagram illustrating a method for providing real-time virtual feedback, according to embodiments as disclosed herein.

FIG. 3 is a flow diagram 300 of a method for providing real-time virtual feedback, according to embodiments as disclosed herein. At 302, the method includes receiving the motion data of each segment in the multi-segment body part related to the first user (i.e., the leaner). In an embodiment, the posture engine 110 is configured to receive the motion data of each segment in the multi-segment body part related to the first user.

At 304, the method includes determining the posture information of each segment in the multi-segment body part based on the motion data of each segment in the multi-segment body part related to the first user. In an embodiment, the posture engine 110 is configured to determine the posture information of each segment in the multi-segment body part based on the motion data of each segment in the multi-segment body part related to the first user.

At 306, the method includes determining the degree of similarity between the posture information of each segment in the multi-segment body part of the first user and the posture information of each segment in the multi-segment body part of the second user. In an embodiment, the posture engine 110 is configured to determine the degree of similarity between the posture information of each segment in the multi-segment body part related to the first user and the posture information of each segment in the multi-segment body part related to the second user. At 308, the method includes providing the virtual feedback to the first user based on the degree of similarity. In an embodiment, the virtual feedback engine 120 is configured to provide the virtual feedback to the first user based on the degree of similarity.

FIGS. 4a, 4b, 4c, 4d and 4e illustrate scenarios in which the electronic device performs a detection of a user in a VR mode and generates a skeleton of the user, according to embodiments as disclosed herein.

Figures 4A, 4B:
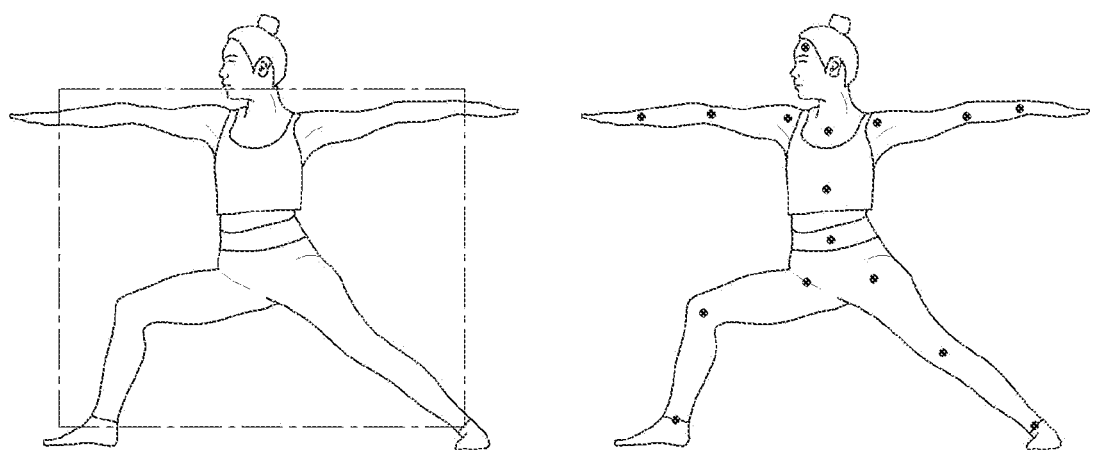
FIGS. 4a, 4b, 4c, 4d and 4e illustrate scenarios in which the electronic device performs a detection of a user in a VR mode and generates a skeleton of the user, according to embodiments as disclosed herein.
Figure 4C:
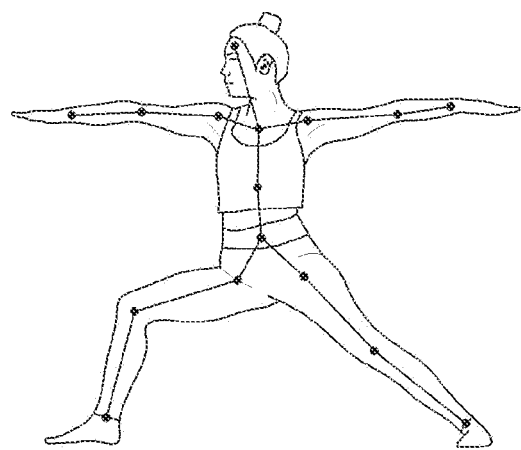
Figure 4D:
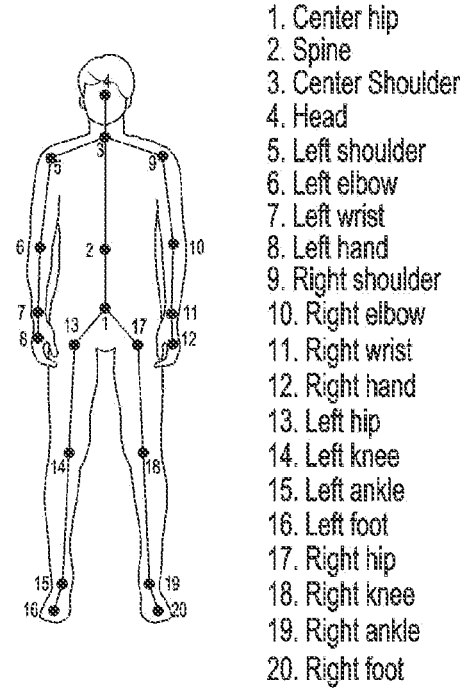
Figure 4E:
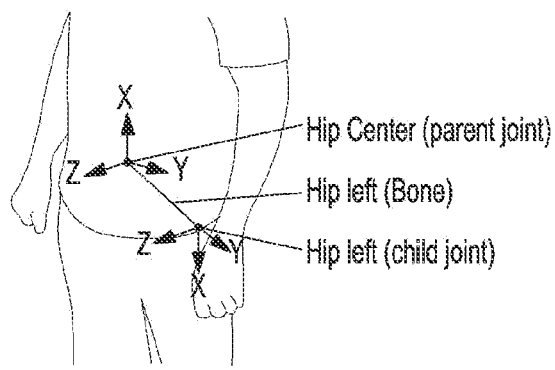

The various operations and function for generating the skeleton of the user is explained in conjunction with the FIG. 1. The FIG. 4a illustrates the user detection, the FIG. 4b illustrates body joints of the user, the FIG. 4c illustrates a pose estimation of the user, the FIG. 4d illustrates 20 joints of the user in a 3D mode, and the FIG. 4e illustrates a calculation of the 18 angular points' data.

Figure 5:
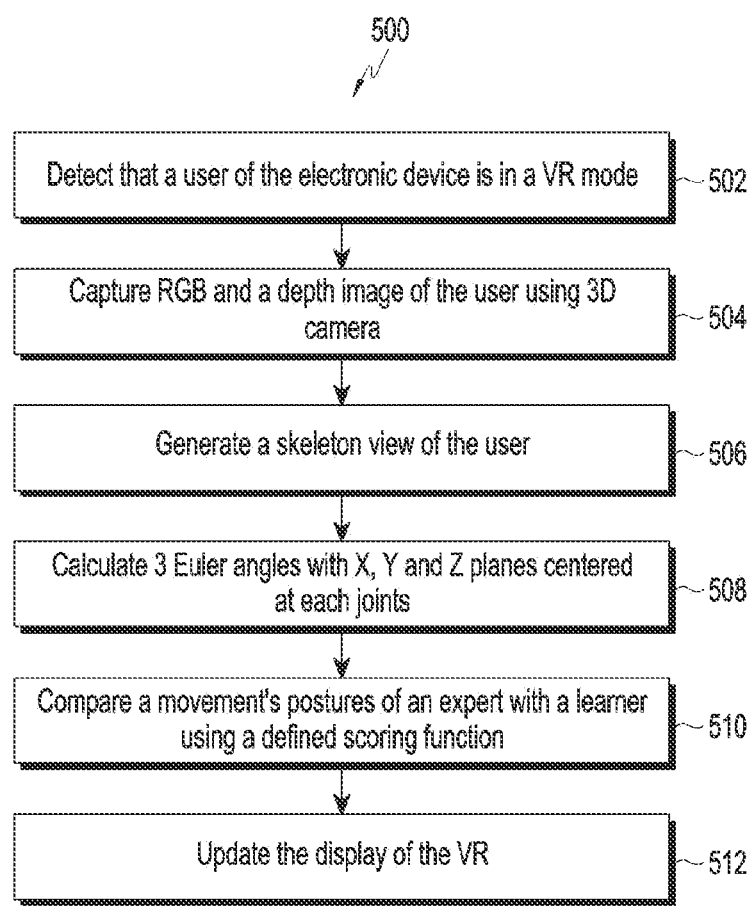
FIG. 5 illustrates a flow diagram of various operations for providing real-time virtual feedback, according to embodiments as disclosed herein.

FIG. 5 illustrate a flow diagram 500 of various operations for providing real-time virtual feedback, according to embodiments as disclosed herein. The operations (502-512) are performed by the posture engine 110. At 502, the method includes detecting that the user (i.e., a leaner) of the electronic device 100 is in the VR mode. At 504, the method includes capturing the RGB and a depth image of the user using the 3D camera. At 506, the method includes generating the skeleton view of the user. At 508, the method includes calculating 3 Euler angles with X, Y and Z planes centered at each joints. At 510, the method includes comparing a movement's postures of an expert with the user using a defined scoring function. At 512, the method includes updating the display of the VR.

Figure 6A:
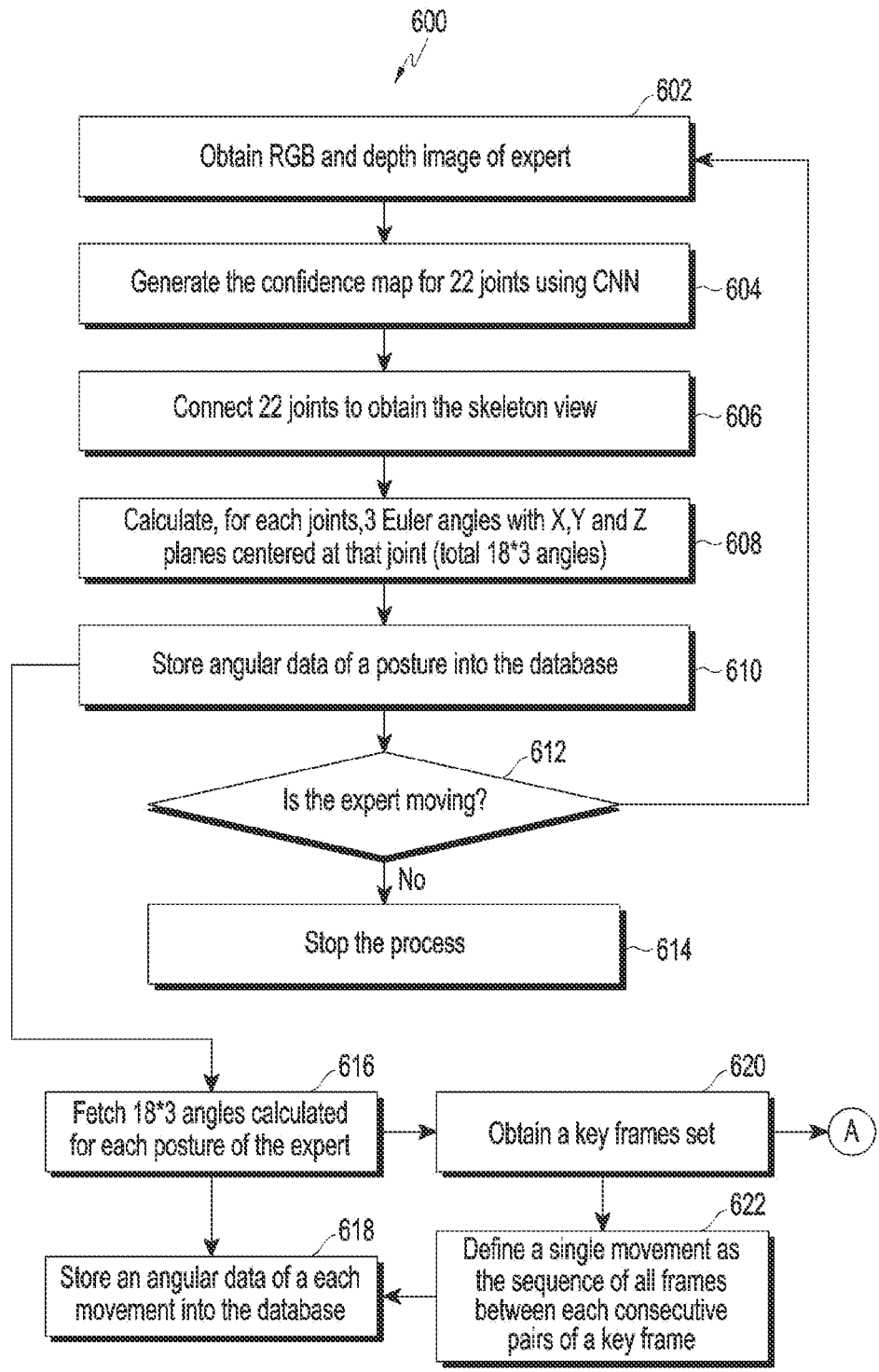
FIGS. 6a and 6b illustrate a flow diagram of various operations for capturing an expert data, according to embodiments as disclosed herein.
Figure 6B:
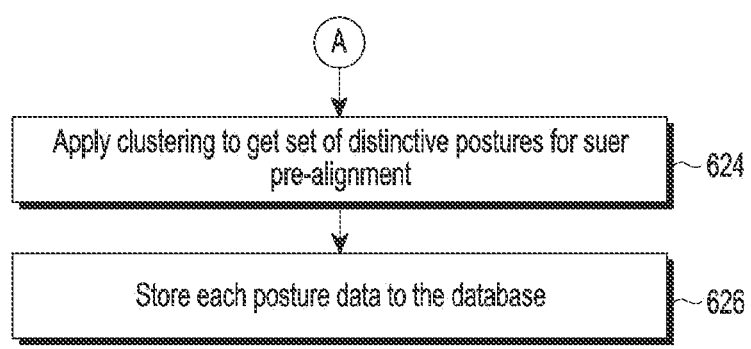

FIGS. 6a and 6b illustrate a flow diagram of various operations for capturing an expert data, according to embodiments as disclosed herein.

The operations (602-626) are performed by the posture engine 110.

At 602, the method includes obtaining the RGB and a depth image of the expert (i.e., the second user). At 604, the method includes generating the confidence map for 22 joints using the CNN. At 606, the method includes connecting 22 joints to obtain the skeleton view of the expert. At 608, the method includes calculating, for each joints, 3 Euler angles with X, Y and Z planes centered at that joint (total 18*3 angles). At 610, the method includes storing angular data of the posture into a database. The database is a part of the memory 130. In an embodiment, the database is external to the memory 130. In another embodiment, the database is internal to the memory 130.

At 612, the method includes determining whether the expert is moving. If the expert is moving then, at 602, the method includes obtaining the RGB and depth image of the expert. If the person is not moving then, at 614, the method includes stopping the process.

At 616, the method includes fetching 18*3 angles calculated for each posture of the expert. At 618, the method includes storing an angular data of each movement into the database. At 620, the method includes obtaining a key frames set. In an embodiment, using iterative end-point fit procedure or curve simplification procedure, for each limbs' angular displacement curve, the posture engine 110 obtains a time window which contains a key posture. The key frames set includes frames that providing the expert's posture (i.e., the key posture).

At 622, the method includes defining the single movement as the sequence of all frames between each consecutive pairs of a key frame. At 624, the method includes applying clustering to get set of distinctive postures for user pre-alignment. The pre-alignment means the user enact some posture to its full stretch and its difference with the expert's pose is noted.

At 626, the method includes storing each posture data to the database.

Figure 7:
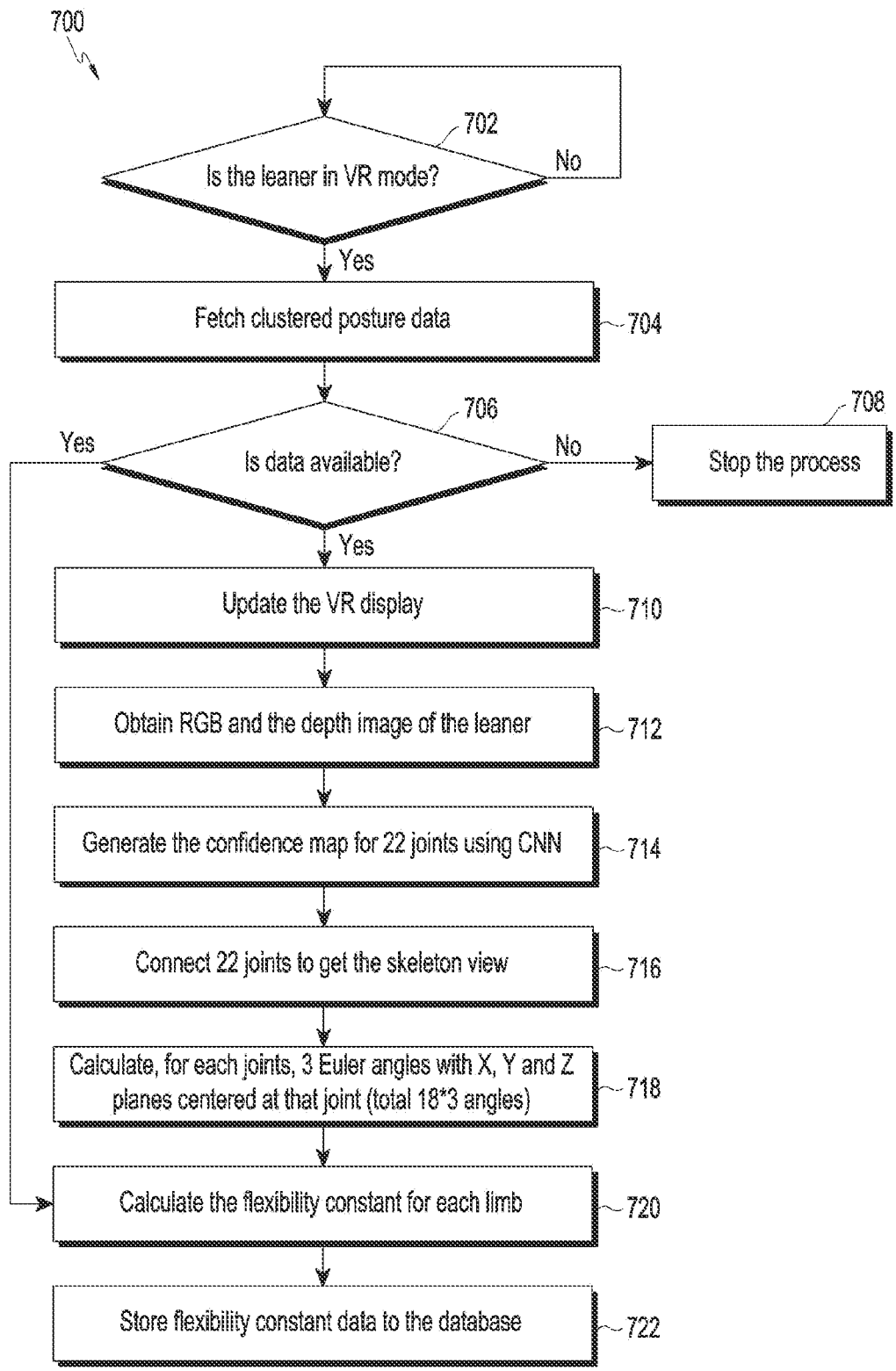
FIG. 7 illustrates a flow diagram of various operations for pre-processing of a learner, according to embodiments as disclosed herein.

FIG. 7 illustrates a flow diagram of various operations for pre-processing of a learner, according to embodiments as disclosed herein. The operations (702-722) are performed by the posture engine 110.

At 702, the method includes determining whether the leaner (i.e., the first user) is in the VR mode. At 704, the method includes fetching the clustered posture data. At 706, the method includes determining whether the posture data is available. If the posture data is not available then, at 708, the method includes stopping the process. If the posture data is available then, at 710, the method includes updating the VR display. At 712, the method includes obtaining the RGB and a depth image of the leaner (i.e., learner). At 714, the method includes generating the confidence map for 22 joints using the CNN. At 716, the method includes connecting 22 joints to obtain the skeleton view. At 718, the method includes calculating, for each joints, 3 Euler angles with X, Y and Z planes centered at that joint (total 18*3 angles). At 720, the method includes calculating the flexibility constant for each limb. At 722, the method includes storing flexibility constant data to the database.

Figure 8A:
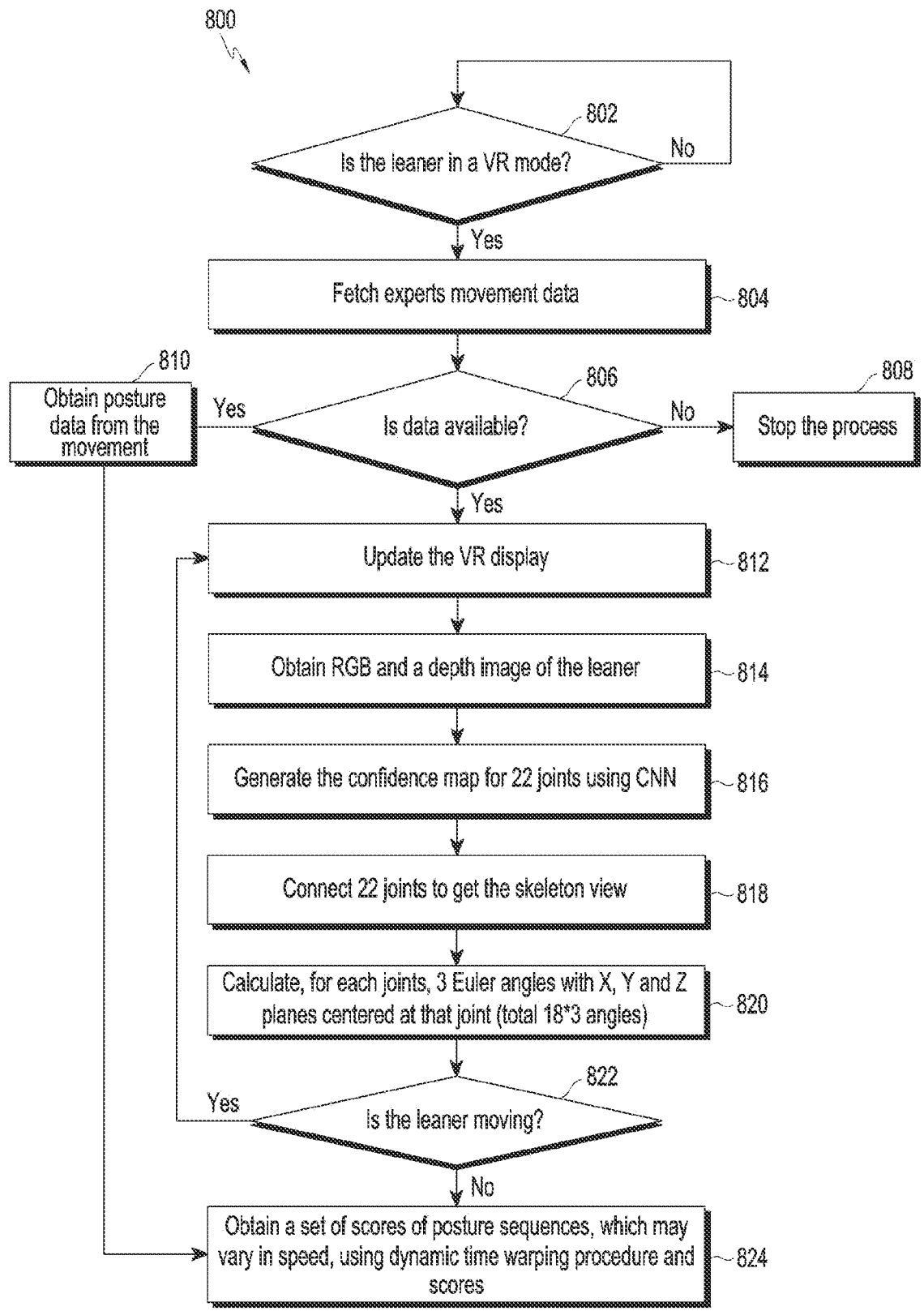
FIGS. 8a and 8b illustrate a flow diagram of various operations for pre-processing of learner, according to embodiments as disclosed herein.
Figure 8B:
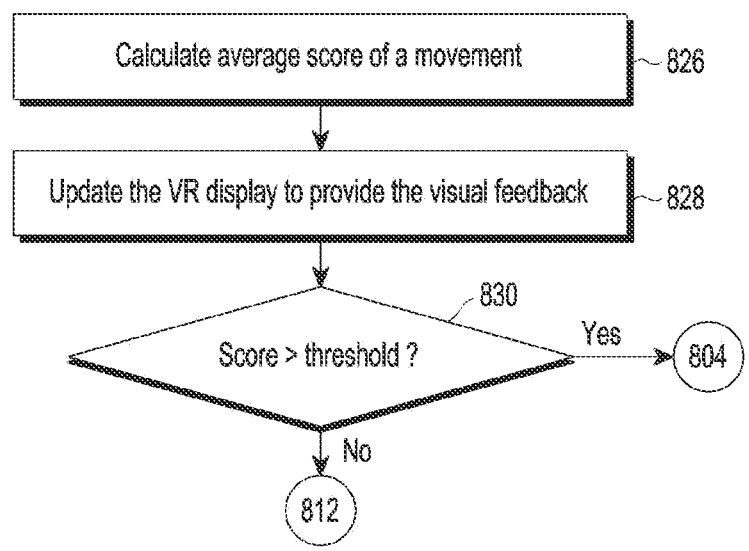

FIGS. 8a and 8b illustrate a flow diagram of various operations for pre-processing of learner, according to embodiments as disclosed herein.

The operations (802-830) are performed by the posture engine 110 and the virtual feedback engine 120.

At 802, the method includes determining that the leaner is in the VR mode. At 804, the method includes fetching the expert's movement data. At 806, the method includes determining that the data is available. If the data is not available then, at 808, the method includes stopping the process. If the data is available then, at 812, the method includes updating the VR display. In another embodiment, if the data is available then, at 810, the method includes obtaining the posture data from the movement of the leaner.

At 814, the method includes obtaining the RGB and a depth image of the leaner. At 816, the method includes generating a confidence map for 22 joints using the CNN. At 818, the method includes connecting 22 joints to obtain the skeleton view. At 820, the method includes calculating, for each joints, 3 Euler angles with X, Y and Z planes centered at that joint (total 18*3 angles). At 822, the method includes determining whether the leaner is moving. If the leaner is moving then, at 812, the method includes updating the VR display. If the leaner is not moving then, at 824, the method includes obtaining the set of scores of posture sequences, which may vary in speed, using dynamic time warping procedure and scores.

At 826, the method includes calculating the average score of the movement. At 828, the method includes updating the VR to provide the visual feedback. At 830, the method includes determining whether the score is greater than threshold. If the score is greater than threshold then, at 804, the method includes fetching the expert movement data. If the score is not greater than threshold then, at 812, the method includes updating the VR display to provide the visual feedback.

Figure 9:
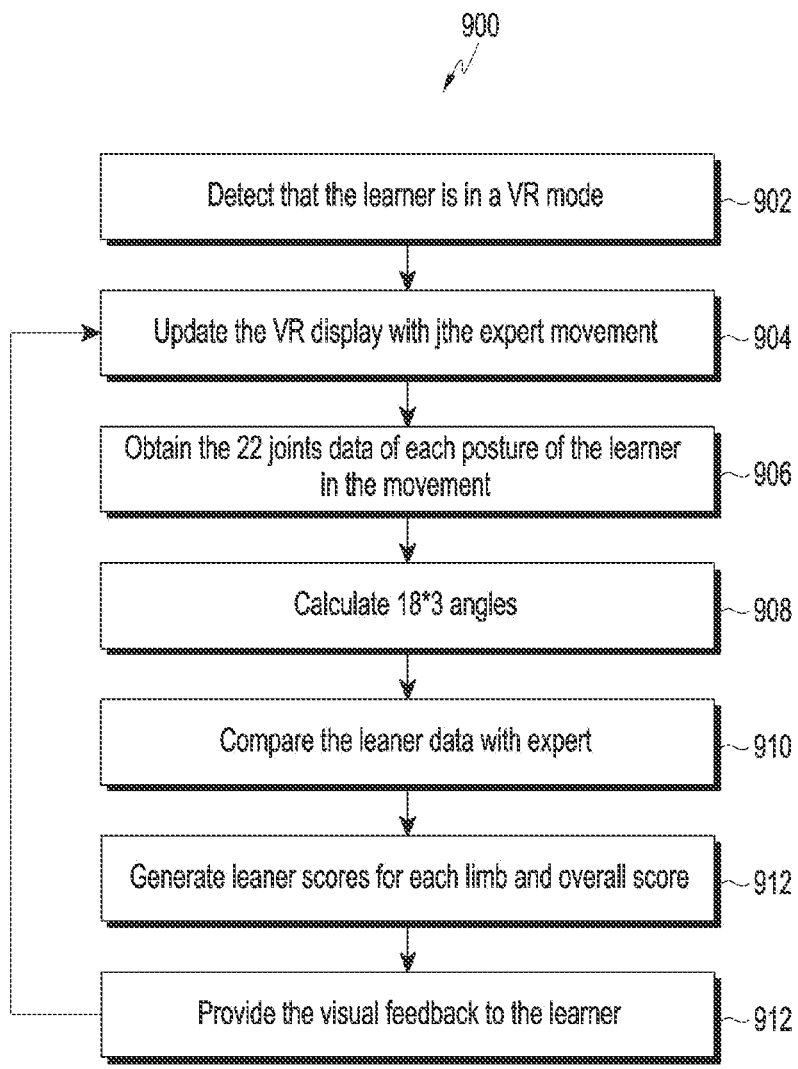
FIG. 9 illustrates a flow diagram of various operations for providing real-time virtual feedback, according to embodiments as disclosed herein.

FIG. 9 illustrates a flow diagram of various operations for providing real-time virtual feedback, according to embodiments as disclosed herein. The operations (902-914) are performed by the posture engine 110 and the virtual feedback engine 120.

At 902, the method includes detecting that the leaner of the electronic device 100 is in the VR mode. At 904, the method includes updating the VR display with the expert movement. At 906, the method includes obtaining the 22 joints data of each posture of learner in the movement. At 908, the method includes calculating 18*3 angles. At 910, the method includes comparing the leaner data with the expert. At 912, the method includes generating leaner scores for each limb and overall score. At 914, the method includes providing the visual feedback to the learner.

Figure 10:
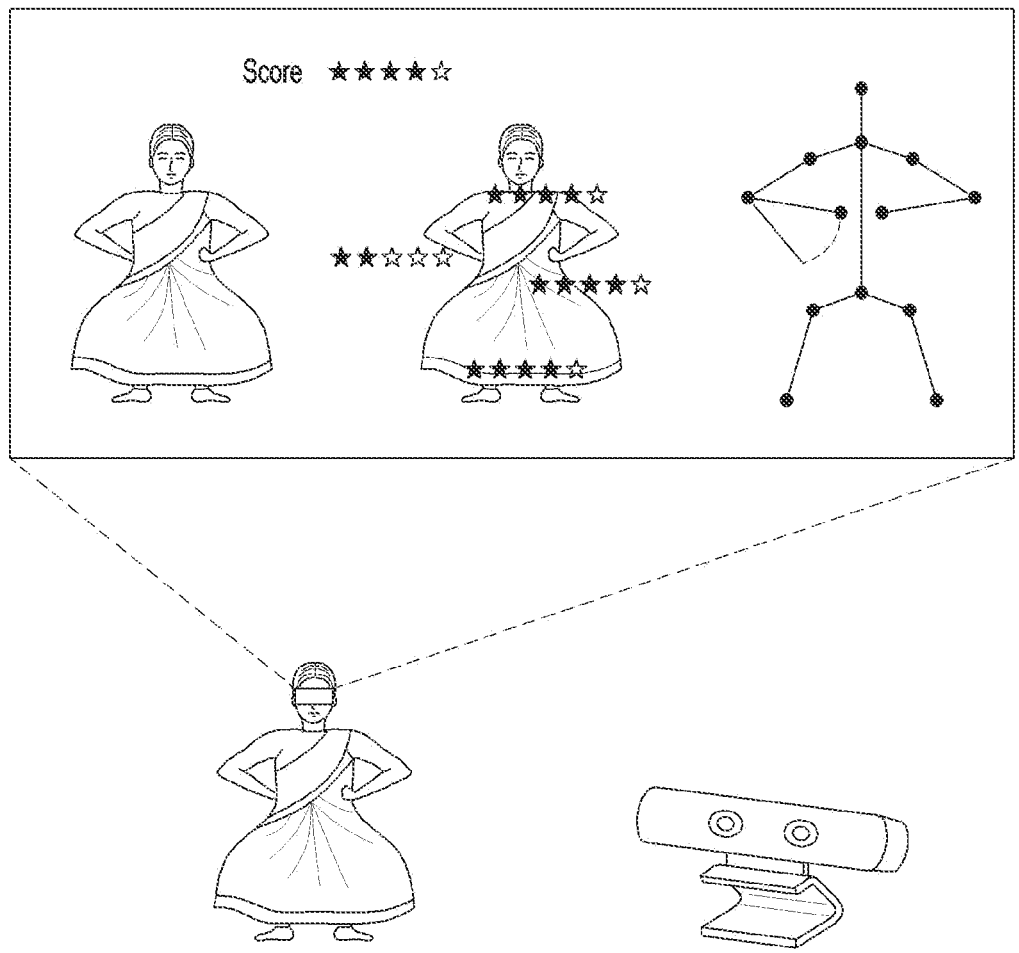
FIG. 10 illustrates a scenario in which the electronic device generates the user scores related to a posture of the user in activities, according to embodiments as disclosed herein.

FIG. 10 illustrates a scenario in which the electronic device generates the user scores related to a posture of the user in activities, according to embodiments as disclosed herein.

The activities can be, for example, but not limited to the exercise activities, yoga activities, dance activities, disease recovery activities or the like.

The FIG. 10 is related to the dance learning activities. As shown in the FIG. 10, the user have to perform the gesture as given with the swipe arrow for each limbs and ultimately hit the point to change its color as shown in the FIG. 10. If all the joints are aligned simultaneously with the expert skeleton within the threshold, then the posture is considered as valid and thus, the overall score is calculated for determining the rating. The arrow will indicate where to move the limb with its color shades denoting extends of movement of limb. Rating for each joints will be given as shown and the overall rating for the particular movements. The user may see his avatar on the VR mode. The electronic device 100 will maintain the user history and shows the improvement from time to time based on the average rating of the movements.

FIGS. 11a, 11b, 11c, 11d, 11e, 11f, 11g, 11h, 11i, 11j, 11k and 11l illustrate scenarios in which the electronic device provides the real-time virtual feedback, while the leaner performs various activities, according to embodiments as disclosed herein.

Figure 11A:
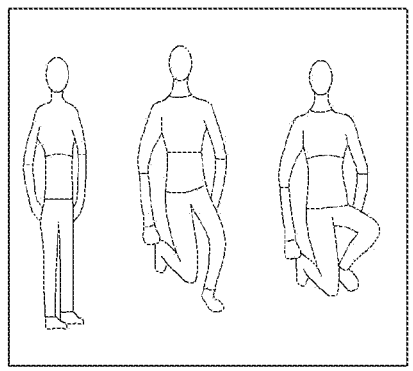
FIGS. 11a, 11b, 11c, 11d, 11e, 11f, 11g, 11h, 11i, 11j, 11k and 11l illustrate scenarios in which the electronic device provides the real-time virtual feedback, while the leaner performs various activities, according to embodiments as disclosed herein.
Figure 11B:
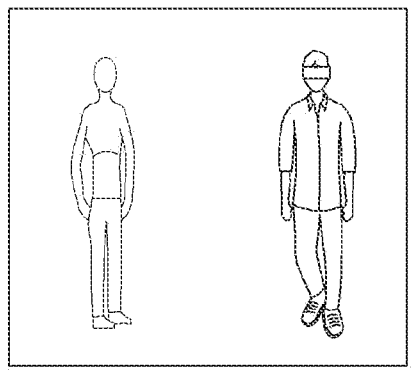
Figure 11C:
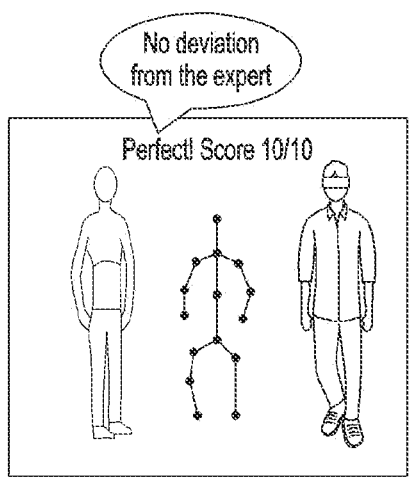
Figure 11D:
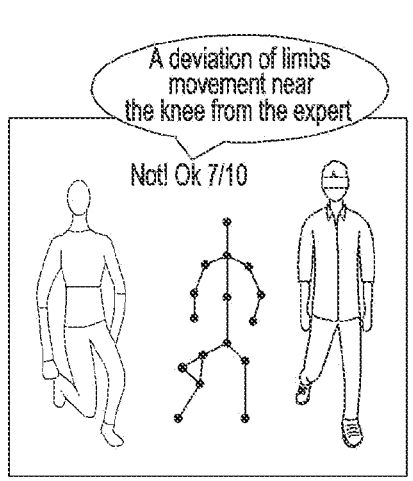
Figure 11E:
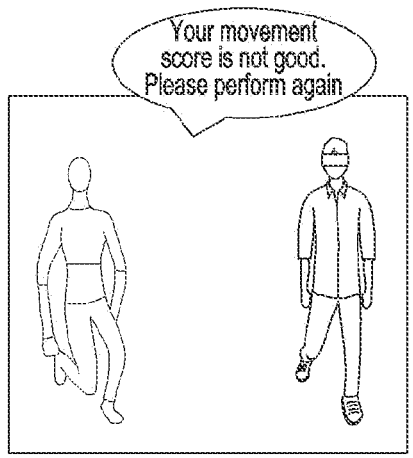
Figure 11F:
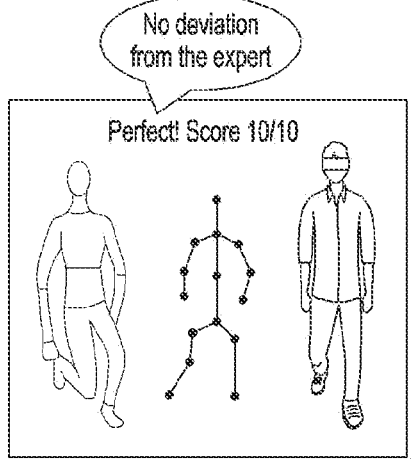
Figure 11G:
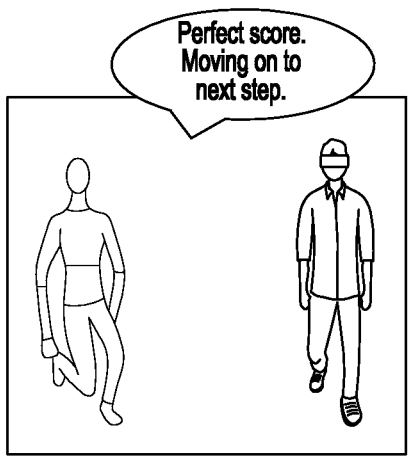
Figure 11H:
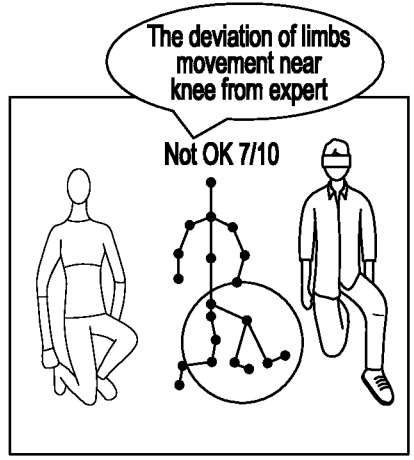
Figure 11I:
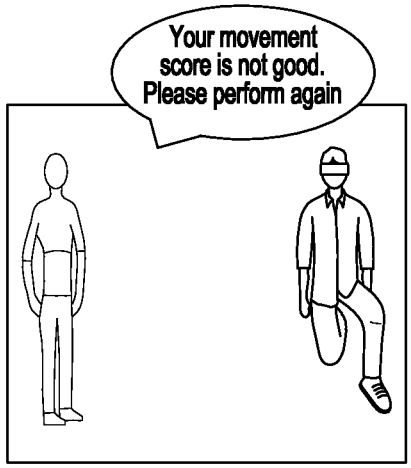
Figure 11J:
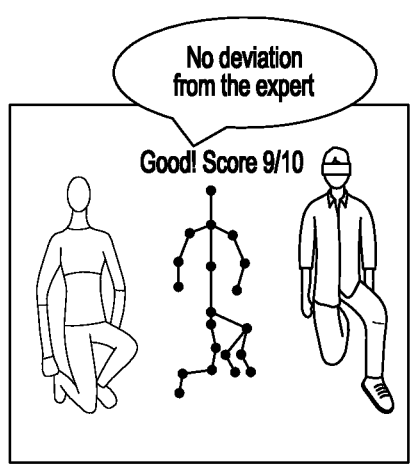
Figure 11K:
Figure 11L:
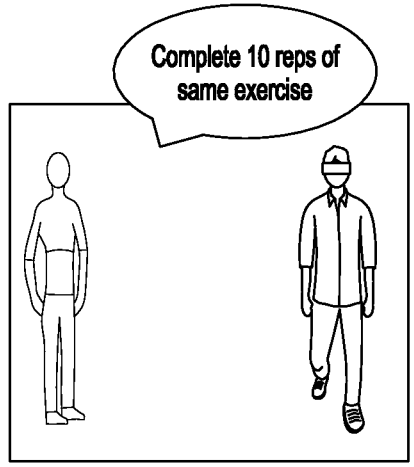

As shown in the FIG. 11a, the electronic device 100 obtains the key frames of movement. As shown in the FIG. 11b, the electronic device 100 displays of first movement between the key posture 1 and 2 by the expert avatar and askes the user to perform the movement. The patient/user starts the first movement and get the feedback at the same time as shown in the FIG. 11c. As shown in the FIG. 11d, the patient/user ends the first movement and get the feedback. Based on the feedback, the electronic device 100 displays the feedback which is "your movement score is not good and please perform again" as shown in the FIG. 11e. The patient/user starts again the same movement and ends as shown in the FIG. 11f. Based on the feedback, the user movement is matched with the expert movement as shown in the FIG. 11f. As shown in the FIG. 11g, the patient/user perform second movement. As shown in the FIG. 11g, the patient/user ends the second movement and get feedback. Based on the feedback, your movement score is not good and please perform again as shown in the FIG. 11h. The patient/user starts again the same movement and ends as shown in the FIG. 11i. Based on the feedback, the user movement is matched with the expert movement as shown in the FIG. 11j and FIG. 11k. Based on the feedback, the electronic device 100 feedbacks the user to do same exercise multiple times to recover from the disease as shown in the FIG. 11l.

Figure 12:
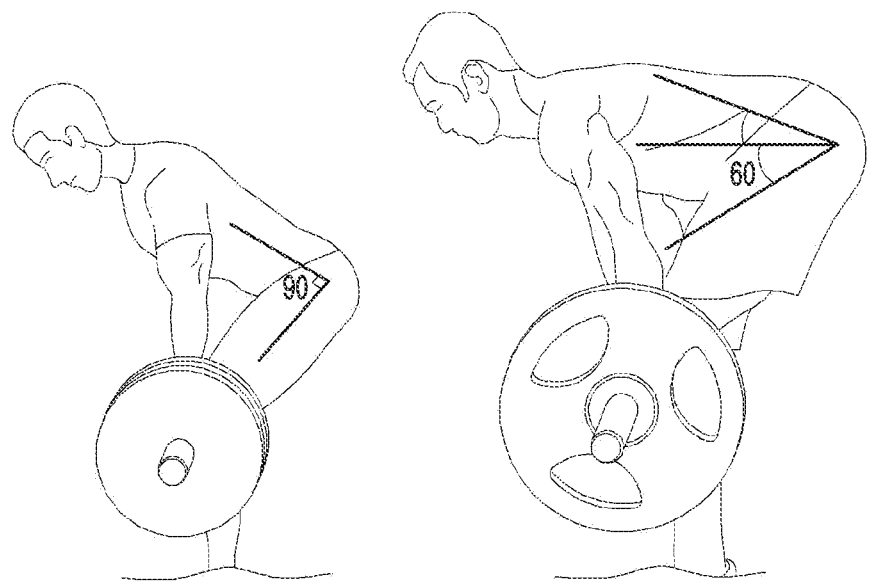
FIG. 12 illustrates a scenario in which an electronic device provides an injury prevention while user does the exercise.

FIG. 12 illustrates a scenario in which an electronic device provides an injury prevention while user does the exercise.

As shown in the FIG. 12, the rendering of the visual feedback along with the avatar on the VR mode to alert user of any possible injuries effect (i.e. the trainer movement angle is 90 degree and the learner is 60 degree, it may leads the back injury). This feedback applies to various exercises such as yoga, sports practice and ballet/dance in order to avoid the injuries. The feedback is provided based on the calculation of error in angle of movement related to the exercise.

Figure 13A:
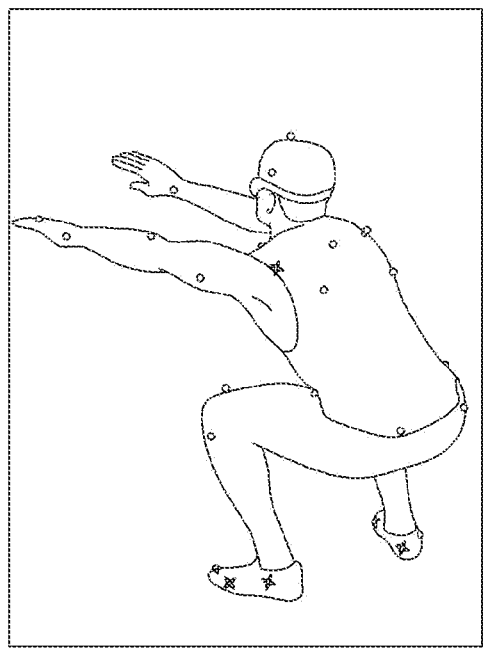
FIGS. 13a and 13b illustrate a scenario in which the haptic suit provides a real-time feedback.
Figure 13B:
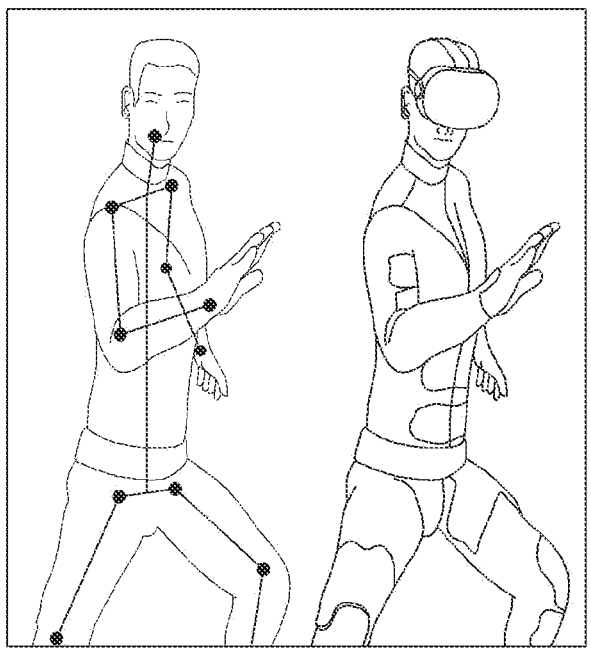

FIGS. 13a and 13b illustrate a scenario in which the haptic suit provides a real-time feedback.

As shown in the FIGS. 13a and 13b, while 3D experiences are common, haptics adds another dimension to the near real experiences technology offers us. By attaching haptic sensor/suit to a user's body, the user can get haptic feedback on wrongly moved limbs, along with the visual feedback. With haptics, the users feel the vibrating force or resistance when they push their limbs in wrong direction. This results in enhancing the training activities.

In another example, if the user (e.g., patient) in the VR mode will be given the list of diseases/disorder for the faster recovery using exercise. When the user select the particular disease/disorder, a virtual trainer get assign to the patient. The trainer and the patient can be seen side by side in the virtual environment like if the trainer is present beside the patient. The trainer performs the exercise and ask user to perform in the same way. The user movement is capture, processed and compared with the trainer and each joints/limbs scores are generated as well as the dynamic movement score. Based on the score, the patient will be given the suggestion as well as the visual feedback by using colors and arrow as to where and how patient should move the particular limbs. After sufficient attempts, the patient can see his/her improvement graph.

In another example, the learner engaged in group or cooperative learning, show increased motivation compared to user learning alone. Along with the AR, a virtual group learning environment can be created where people can interact virtually. The user can share the feedback with others global users and learn where they stands in terms of learning.

The various actions, acts, blocks, steps, or the like in the flow diagrams 300, 500-900 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiment as described herein.

The invention claimed is:

1. A method for providing real-time feedback using an electronic device, comprising:
    obtaining, by the electronic device, a motion data of each body part related to a first user;
    determining, by the electronic device, a posture information of the each body part related to the first user based on the motion data of the each body part related to the first user;
    determining, by the electronic device, a degree of similarity between the posture information of the each body part related to the first user and a stored posture information of each body part related to a second user; and
    providing, by the electronic device, a virtual feedback comprising a haptic feedback and a visual indication based on the determined degree of similarity,
    wherein the visual indication comprises a plurality of first ratings each corresponding to a respective joint of the first user, and a second rating corresponding to an overall score for a posture of the first user,
    wherein the method further comprises:
        determining whether all of a plurality of joints of the first user are aligned with the stored posture information of each body part related to the second user within a threshold; and
        calculating the overall score for the posture of the first user, in response to determining that all of the plurality of joints of the first user are aligned with the stored posture information of each body part related to the second user within the threshold.

2. The method of claim 1, wherein determining the posture information of the each body part related to the first user comprises:
    identifying at least one of an activity of the first user;
    generating a virtual skeleton view of the each body part related to the first user, wherein the virtual skeleton view is generated based on a red, green and blue (RGB) image and a depth image of the each body part related to the first user captured by the electronic device;
    determining at least one angle of limbs movement and a deviation of the each body part related to the first user corresponding a motion data of each body part related to the second user; and
    determining the posture information of the each body part related to the first user based on at least one of the angle of the limbs movement and the deviation of the each body part related to the first user.

3. The method of claim 2, wherein the determining the at least one angle of the limbs movement and the deviation of the each body part related to the first user comprises:
   determining angular components of the first user and angular components of the second user;
   determining an angular displacement based on difference in the angular components of the first user and the angular components of the second user;
   determining a score related to a posture of the first user based on the angular components of the first user, the angular components of the second user and a flexibility constant for the each body part; and
   determining the deviation of the each body part related to the first user based on the score, wherein the angular components of the first user is related to the each body part of the first user and the angular components of the second user is related to the each body part of the second user.

4. The method of claim 1, wherein the determining, by the electronic device, the degree of similarity comprises:
   determining a match between each body part related to the first user with each body part related to the second user; and
   determining the degree of similarity based on the match.

5. The method of claim 1, wherein the providing the virtual feedback comprises:
   displaying an avatar of the first user and an avatar of the second user; and
   displaying the visual indication corresponding to the avatar of the first user based on the degree of similarity, wherein the visual indication comprises a feedback for the each body part of the first user.

6. The method of claim 1, wherein the virtual feedback further comprises an audio feedback indicating the degree of similarly.

7. The method of claim 1, wherein the each body part comprises at least one of: a lower arm, a upper arm, fingers, a palm, a head, a neck, a torso, an ankle, a knee, a hip, a shoulder, an elbow, a wrist or an upper neck.

8. An electronic device for providing real-time virtual feedback, comprising:
   a memory; and
   a processor; and
   the processor coupled to the memory, wherein the processor is configured to:
      obtain a motion data of each body part related to a first user,
      determine a posture information of the each body part related to the first user based on the motion data of the each body part related to the first user,
      determine a degree of similarity between the posture information of the each body part related to the first user and a stored posture information of each body part related to a second user, and
      provide virtual feedback comprising a haptic feedback and a visual indication based on the determined degree of similarity,
      wherein the visual indication comprises a plurality of first ratings each corresponding to a respective joint of the first user, and a second rating corresponding to an overall score for a posture of the first user,
      wherein the processor is further configured to:
         determine whether all of a plurality of joints of the first user are aligned with the stored posture information of each body part related to the second user within a threshold; and
         calculate the overall score for the posture of the first user, in response to determining that all of the plurality of joints of the first user are aligned with the stored posture information of each body part related to the second user within the threshold.

9. The electronic device of claim 8, wherein the processor is further configured to:
   identify at least one of an activity of the first user,
   generate a virtual skeleton view of the each body part related to the first user, wherein the virtual skeleton view is generated based on a red, green and blue (RGB) image and a depth image of the each body part related to the first user captured by the electronic device,
   determine at least one angle of limbs movement and a deviation of the each body part related to the first user corresponding a motion data of each body part related to the second user, and
   determine the posture information of the each body part related to the first user based on at least one of the angle of the limbs movement and the deviation of the each body part related to the first user.

10. The electronic device of claim 9, wherein the processor is further configured to:
    determine angular components of the first user and angular components of the second user,
    determine an angular displacement based on difference in the angular components of the first user and the angular components of the second user,
    determine a score related to a posture of the first user based on the angular components of the first user, the angular components of the second user and a flexibility constant for the each body part, and
    determine the deviation of the each body part related to the first user based on the score,
    wherein the angular components of the first user is related to the each body part of the first user and the angular components of the second user is related to the each body part of the second user.

11. The electronic device of claim 8, wherein the processor is further configured to:
    determine a match between each body part related to the first user with each body part related to the second user, and
    determine the degree of similarity based on the match.

12. The electronic device of claim 8, wherein the processor is further configured to:
    display an avatar of the first user and an avatar of the second user, and
    display the visual indication corresponding to the avatar of the first user based on the degree of similarity, wherein the visual indication comprises a feedback for the each body part of the first user.

13. The electronic device of claim 8, wherein the virtual feedback comprises an audio feedback indicating the degree of similarly.

* * * * *